United States Patent [19]

Fornasier et al.

[11] Patent Number: 4,985,539

[45] Date of Patent: Jan. 15, 1991

[54] LIQUID-CRYSTALLINE, THERMOTROPIC POLYMER FROM DI-S-TRIAZINE AND DIAMINE

[75] Inventors: Roberto Fornasier; Massimo Tornatore, both of Novara; Larry L. Chapoy, Lesa, all of Italy

[73] Assignee: Himont Italia s.r.l., Milan, Italy

[21] Appl. No.: 322,424

[22] Filed: Mar. 13, 1989

[30] Foreign Application Priority Data

Mar. 14, 1988 [IT] Italy .................................. 4100 A/88

[51] Int. Cl.$^5$ .............................................. C08G 73/06
[52] U.S. Cl. ...................................... 528/423; 528/211
[58] Field of Search ........................................... 528/423

[56] References Cited

U.S. PATENT DOCUMENTS 4,562,246  12/1985  Wang et al. ......................... 528/423

*Primary Examiner*—Harold D. Anderson
*Attorney, Agent, or Firm*—Stevens, Davis, Miller & Mosher

[57] ABSTRACT

Polymers obtained from the polycondensation of at least one di-s-triazine of the formula:

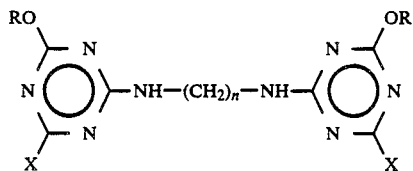

wherein:

R represents a linear or branched alkyl radical containing from 1 to 5 carbon atoms, X represents a halogen, and n is an integer within the range of from 5 to 30, with at least one other copolymerizable monomer, capable of yielding a liquid-crystalline, thermotropic polymer.

5 Claims, No Drawings

LIQUID-CRYSTALLINE, THERMOTROPIC POLYMER FROM DI-S-TRIAZINE AND DIAMINE

DESCRIPTION OF THE INVENTION

The present invention relates to liquid-crystalline, thermotropic polymers of di-s-triazines.

More particularly, the present invention relates to easily processable liquid-crystalline, thermotropic polymers of di-s-triazines, having their mesogen group in their backbone chain.

From the relevant technical literature, polymers of di-s-triazines are known. In European patent application Ser. No. 53,775, for example, light stabilizers for polyolefins, or for acrylic polymers are disclosed, which are obtained by means of the polycondensation of a diamine and a di-s-triazine derivative. This latter product is constituted by two triazine rings linked by means of a diamine, and substituted in their 2-position with a halogen, and in their 4-position with a group selected from halogens, or phenyl, alkoxy, amino radicals, and so forth.

In accordance with the present invention, it has now been discovered that di-s-triazine derivatives containing two triazine rings substituted in their 2- or 4-positions with particular alkoxy groups, may, when copolymerized together with suitable monomers, yield liquid-crystalline, thermotropic polymers.

It is known that liquid-crystalline, thermotropic polymers have the property of maintaining, when they are in their molten state, or in their softened state, and within well defined temperature ranges, an organized, or ordered, arrangement of the polymeric chains, which is maintained by the polymer in the solid state, thus imparting to the polymer special physical-mechanical properties, such as a high elastic modulus, a high ultimate tensile strength, and, in general, the typical properties of a fiber-reinforced polymer.

Therefore, an object of the present invention is to provide polymers obtained from the polycondensation of at least one di-s-triazine of the formula:

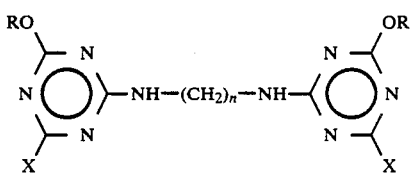

wherein:
R represents a linear or branched alkyl radical containing from 1 to 5 carbon atoms,
X represents a halogen such as chlorine or bromine, and
n is an integer within the range of from 5 to 30,
with at least one other copolymerisable monomer, capable of yielding a liquid-crystalline, thermotropic polymer.

Examples of di-s-triazines having the formula (1) are: N,N'-bis-(2-chloro-4-methoxy-1,3,5-triazinyl)-1,12-diamino-dodecane; N,N'-bis-(2-chloro-4-ethoxy-1,3,5-triazinyl)-1,12diamino-dodecan; N,N'-bis-(2-chloro-4methoxy-1,3,5-triazinyl)-hexamethylene-diamine; N,N'-bis-(2-chloro-4-methoxy-1,3,5-triazinyl)-1,10-diaminodecane; N,N'-bis-(2-chloro-4-ethoxy-1,3,5-triazinyl-mexamethylene-diamine; and so forth.

The copolymerizable monomers are preferably selected from among diamines and diphenols, and, in particular, from the group consisting of diamines having the formula:

$$H_2N-R_1-NH_2 \qquad (2)$$

wherein:
$R_1$ represents an alkyl radical, a cycloalkyl radical, or an alkyl-aryl radical of from 1 to 20 carbon atoms, and the group consisting of diphenols having the formula:

$$HO-Ar-OH \qquad (3)$$

wherein:
Ar represents an aryl radical containing from 6 to 18 carbon atoms, possibly substituted with halogens or with alkyl groups, aryl groups, or alkyl-aryl groups of from 1 to 20 carbon atoms.

As such copolymerizable monomers, ($C_4$-$C_{15}$)-heterocyclic products, formed by cycloaliphatic diamines containing at least one of their two reactive nitrogen atoms in the ring of the cycloaliphatic radical, may also be used.

Examples of copolymerizable monomers are: 1,2-diamino-ethane; 1,6-diamino-hexane; 1,12-diaminododecane; piperazine; p-phenylene-diamine; m-phenylene-diamine; 4,4'-diamino-diphenyl; hydroquinone; methyl-hydroquinone; phenylhydroquinone; (1-phenylethyl)-hydroquinone; (2-phenyl-isopropyl)-hydroquinone; 4,4'-di-hydroxy-diphenyl; 2,6-di-hydroxy-naphthalene; 1,5-di-hydroxy-naphthalene; and so forth.

Polymers according to the present invention have a structure of nematic-glass type, as one can verify by means of optical-microscopy analysis under polarized light, and from the X-ray diffraction spectrum, wherein only a broad peak at $2\theta=22$, typical of amorphous materials, is found; and an intrinsic viscosity, measured in formic acid at 30° C., and at a concentration of 0.25 g/dl, generally within the range of from 0.5 to 10 dl/g.

The glass transition temperature may vary over wide limits, according to the composition of the polymer and the degree of polymerization; such a temperature is generally within the range of from 50° to 300° C.

The liquid-crystalline polymers of the present invention may be used for producing shaped bodies, which may be prepared by means of fabrication technologies customarily used for thermoplastic polymers, such as, e.g., injection molding or extrusion. They may be processed in order to yield films or fibers, and may be used as matrices for composite materials containing inorganic fibers or fillers, and may be used in the preparation of blends with other polymers.

The polymers according to the present invention may be obtained by means of conventional techniques, such as by reacting the above-mentioned monomers in equimolecular ratios, under the usual conditions for polycondensation reactions.

Such a reaction takes place in the presence of a high-boiling solvent having a good solvating power for the reactants, such as, e.g., aromatic solvents and chlorinated (both aliphatic and aromatic) solvents.

Examples of such solvents are xylene, trichlorobenzene, and so forth.

The polycondensation temperature is within the range of from 100° to 250° C., and the reaction is carried out in the presence of a base, such as sodium carbonate or pyridine, if desired under a stream or an overlying blanket of nitrogen.

At the end of the reaction, the polymer may be recovered by mans of per se known techniques, such as solvent evaporation, precipitation, and so forth.

The di-s-triazine derivatives of the formula (1) are disclosed in Italian patent application Ser. No. 21,369/A87, and may be obtained by the reaction of a 2,4-dichloro-6-alkoxy-1,3,5triazine with an alkylidene-diamine according to conditions such as disclosed in European patent application Ser. No. 53,775.

In order still better to understand the present invention and to practice it, some illustrative but nonlimitative examples are reported below.

EXAMPLE 1

To an Erlenmeyer flask of 100 ml of capacity equipped with a reflux condenser, 2.57 g (5 mmols) of N,N'-bis-(2-chloro-4-ethoxy-1,3,5-triazinyl)-1,12-diamino -dodecane, 1.00 g (5 mmols) of 1,12-diamino-dodecane, 50 ml of xylene, and 8 g of anhydrous sodium carbonate are charged under a slight nitrogen stream.

The whole mass is kept under magnetic stirring, and under an overhead nitrogen blanket for 60 hours at 130° C.

The reaction mass is allowed to cool, still under an overhead nitrogen blanket, and with stirring. The reaction mass is poured into 200 ml of acetone, and a precipitate is obtained which is then filtered off.

The so-obtained polymer is washed twice with acetone, dissolved in 100 ml of formic acid in order to remove the inorganic salts formed and the excess of sodium carbonate, precipitated again in 600 ml of water, filtered and washed twice with water.

The end product is dried under vacuum for 16 hours at 130° C.

The dried polymer has a glass transition temperature (Tg) of 93° C. (as determined by means of the DSC—Differential Scanning Calorimeter, at a temperature increase rate of 20° C/minute), and an intrinsic viscosity of 8.70 dl/g (as measured at the temperature of 30° C. in formic acid).

The X-ray diffraction spectrum under reflexion (CuKα, Ni filter) shows that the polymer has a completely amorphous structure.

The polymer in the molten state is endowed with optical anisotropy when observed under the crossed-polarizers microscope.

EXAMPLES 2-7

By operating with the same procedures of Example 1, other polymers are prepared by starting from a monomer having the formula:

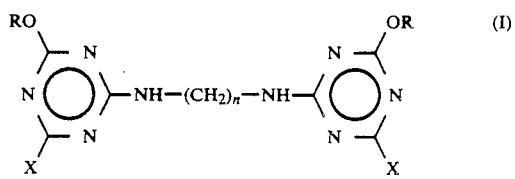

wherein R and n have the values reported in the following Table, and from the comonomers:

A: $H_2N-(CH_2)_{12}-NH_2$

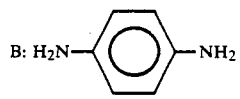

The characteristics of the corresponding polymers are reported in the following Table.

| Examples | R | n | η | $T_g$ | Comonomer |
|---|---|---|---|---|---|
| 2 | $CH_3$ | 6 | insoluble | 55 | A |
| 3 | $C_2H_5$ | 6 | 5.24 | 70 | A |
| 4 | $C_2H_5$ | 12 | 8.70 | 55 | A |
| 5 | $C_2H_5$ | 6 | 4.57 | 146 | B |
| 6 | $CH_3$ | 12 | 4.19 | 130 | B |
| 7 | $C_2H_5$ | 12 | 2.00 | 124 | B |

η: intrinsic viscosity (dl/g)
$T_g$: glass transition temperature (°C.)

We claim:

1. A polymer obtained by the polycondensation of at least one di-s-triazine of the formula:

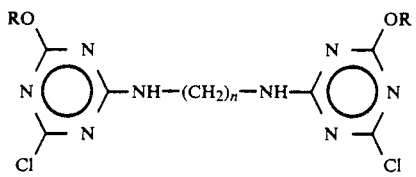

wherein:
R represents a linear or branched alkyl radical containing from 1 to 5 carbon atoms,
X represents a halogen, and
n is an integer within the range of from 5 to 30, with at least one other copolymersiable monomer selected from diamines having the formula:

$$H_2N-R_1-NH_2 \qquad (2)$$

wherein:
$R_1$ represents a divalent alkyl radical, a cycloalkyl radical, or an alkyl-aryl radical of from 1 to 20 carbon atoms.

2. A polymer according to claim 1 or 3, wherein the copolymerizable monomers are selected from the class consisting of 1,2-diamino-ethane; 1,6-diamino-hexane; 1,12-diamino-dodecane; p-phenylene-diamine; m-phenylene-diamine; and 4,4'-diamino-diphenyl.

3. A polymer according to claim 1, wherein the di-s-triazines having the formula (1) are selected from the class consisting of N,N'-bis-(2-chloro-4-ethoxy-1,3,5-triazinyl)-1,12-diamino-dodecane; N,N'-bis-(2-chloro-4-methoxy-1,3,5-triazinyl)-hexamethylene-diamine; N,N'-bis-(2-chloro-4-methoxy-1,3,5-triazinyl)-1,10-diaminodedcane; and N,N'-bis-(2-chloro-4-ethoxy-1,3,5-triazinyl)-hexamethylene-diamine.

4. A polymer according to claim 1 or 3, having an intrinsic viscosity, measured in formic acid at 30° C., at the concentration of 0.25 g/dl, within the range of from 0.5 to 10 dl/g, and a glass transition temperature within the range of from 50° to 300° C.

5. A polymer obtained according to claim 1 or 3 in the form of fiber, film, shaped body fabricated by injection or extrusion, matrix for composite materials containing inorganic fiber or filler.

* * * * *